(No Model.)
J. F. BUNNELL.
INSECT TRAP.
No. 280,291. Patented June 26, 1883.
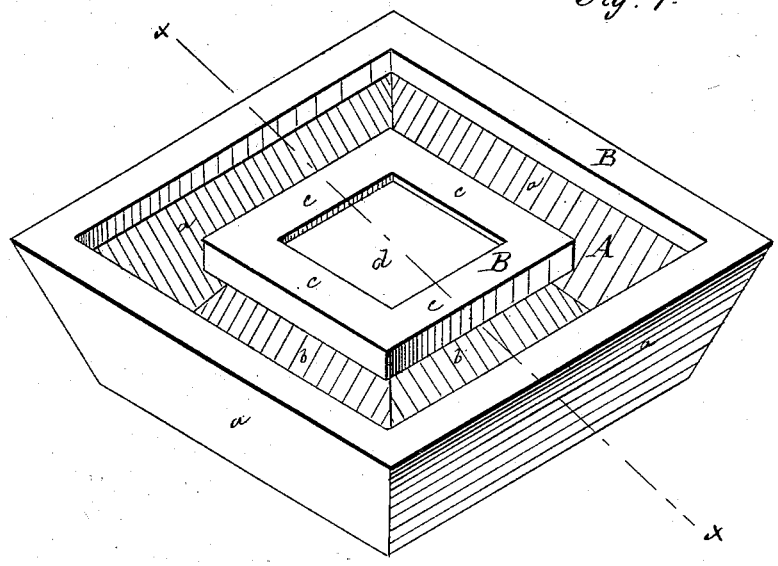
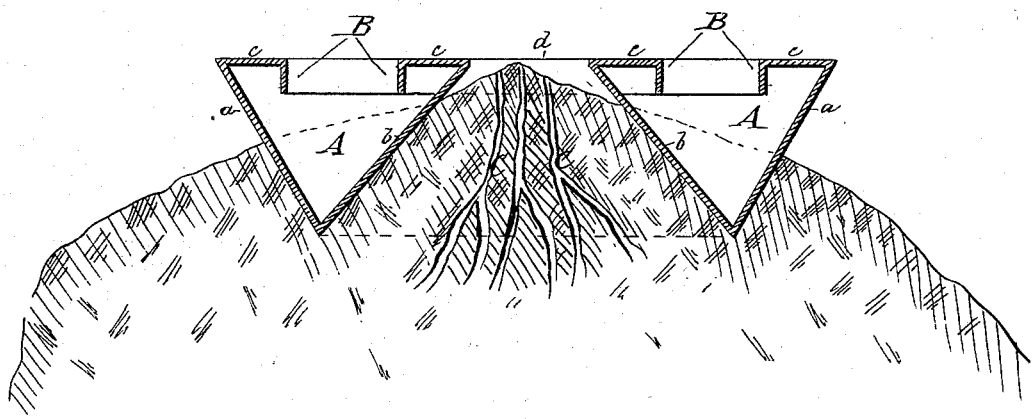
WITNESSES:
Chas. Nida.
Solon C. Kemon
INVENTOR:
James F. Bunnell
BY Munn & Co
ATTORNEYS.

UNITED STATES PATENT OFFICE.

JAMES F. BUNNELL, OF CISCO, TEXAS.

INSECT-TRAP.

SPECIFICATION forming part of Letters Patent No. 280,291, dated June 26, 1883.

Application filed October 7, 1882. (No model.)

*To all whom it may concern:*

Be it known that I, JAMES F. BUNNELL, of Cisco, in the county of Eastland and State of Texas, have invented a new and Improved Ant-Trap, of which the following is a full, clear, and exact description, reference being had to the accompanying drawings, and letters of reference marked thereon, in which—

Figure 1 is a perspective view of my improved ant-trap; and Fig. 2 is a cross-sectional elevation of the same on the line $x\ x$ of Fig. 1, and showing the trap securely anchored around the mouth of an ant-hill.

Similar letters indicate like parts in both the figures.

Heretofore ant-traps have been constructed in which a circular trough having a central opening adapted to be placed over the mouth of the ant-hill, and provided with an upwardly and outwardly inclined conical flange, forming the inner side of the trough and springing from the circumference of the central opening, and terminating at its upper end in a short inclined flange leading downwardly into the trough, the outside of the trough being formed of a conical flange springing from the outer circumference of the base of the trough, and inclined inwardly and terminating at its upper end in a short downwardly-inclined flange leading into the trough, has been employed to entrap ants; but in this construction the base of the trap is intended to rest on the uneven ground around the mouth of the ant-hill, and no means are provided for securing the trap to the ground with its central opening over the mouth of the hill, and the trap, after being placed in position, is liable to be moved therefrom by the wind or other causes.

To remedy this defect in this class of ant-traps is the object of my invention; and to this end it consists in forming the trough of a quadrangular form, and V-shaped in cross-section, with the plates of the opposite sections of the trough forming wedges adapted to be forced into the ground around the mouth of the ant-hill and securely anchor the trap in the ground, as hereinafter more fully set forth, and pointed out in the claim.

The box or vessel A, preferably made of metal, is a quadrangular trough, V-shaped in cross-section, forming wedges adapted to be forced into the ground around the mouth of an ant-hill.

$c\ c$ represent the horizontal upper parts of the trough, terminating in the downwardly-projecting flanges B B.

$d$ represents a central opening surrounded by the trough, and formed by the inwardly-inclined planes $b$ of the trough.

The trap is placed over an ant-hole, as at C, Fig. 2, in such manner that it surrounds the ant-hole, which will be in the central opening, $d$, of the trap, and the wedge-shaped trough is forced into the ground and securely anchored thereto around the mouth of the ant-hole, which is flush, or nearly so, with the upper face of the trap. If the ants leave their hole, they will be in the inner opening, $d$, of the trap, and can only escape by crawling over the trough. If they crawl into the trough, they cannot get out, because of the downwardly-projecting flanges B, and must remain therein until killed by the rays of the sun or some poisonous liquid placed in the trough.

Having thus fully described my invention, what I claim as new, and desire to secure by Letters Patent, is—

The improved ant-trap herein described, consisting of the quadrangular trough A, surrounding the central opening, $d$, and made V-shaped in cross-section, and provided with the flanges $c$ B, substantially as described, whereby the opposing sides of the trough are adapted to the configuration of the ant-hill, and the trap can be securely anchored around the same, as set forth.

JAMES F. BUNNELL.

Witnesses:
F. E. LARIMER,
S. A. GORTNER.